UNITED STATES PATENT OFFICE.

HENRY F. FERRIS, OF ST. LOUIS, MISSOURI, ASSIGNOR TO THE PAPERINE MANUFACTURING COMPANY, OF EAST ST. LOUIS, ILLINOIS.

MATERIAL FOR RAILWAY-RAILS, BUILDING-BLOCKS, PAVING-BLOCKS, &c.

SPECIFICATION forming part of Letters Patent No. 386,064, dated July 10, 1888.

Application filed February 16, 1888. Serial No. 264,267. (No specimens.)

*To all whom it may concern:*

Be it known that I, HENRY F. FERRIS, of the city of St. Louis, in the State of Missouri, have invented a certain new and useful Improvement in Material for Railway-Rails, Building-Blocks, Paving-Blocks, Barrel Heads and Bungs, &c., of which the following is a full, clear, and exact description.

My invention consists in a new material composed of three ingredients—namely, paper-pulp, silicate soda, and barytes.

In preparing the material the parts are mixed in about the proportions of five hundred parts of paper-pulp, twenty-five parts of silicate soda, and ten parts of barytes. The soda and barytes are first mixed together, and then mixed with the pulp, and the whole is then pressed or molded into the desired articles. This material is useful in the manufacture of railway-rails, building-blocks, paving-blocks, barrel heads and bungs, and numerous other articles.

I do not confine myself to the proportions given, as the same may be varied without departing from the spirit of my invention; nor do I confine myself to the particular uses mentioned, as the compound may be used in the manufacture of still other articles.

I claim—

The material composed of paper-pulp, silicate soda, and barytes, mixed together in substantially the proportions named, and substantially in the manner specified.

HENRY F. FERRIS.

In presence of—
GEO. H. KNIGHT,
JOS. WAHLE.